March 20, 1962   H. C. A. VAN DUUREN ET AL   3,026,372
MULTIFREQUENCY TELEGRAPH SYSTEM INCLUDING
MEANS FOR CHECKING THE ADVERSE INFLUENCE
OF SIGNAL ELEMENT PROLONGATION
Filed July 14, 1959   7 Sheets-Sheet 1
FIG. 1.
FIG. 2.
FIG. 3.
FIG. 4.
INVENTORS:
H. C. A. VAN DUUREN,
JAN TUINMAN.
BY
ATT'Y.

March 20, 1962  H. C. A. VAN DUUREN ET AL  3,026,372
MULTIFREQUENCY TELEGRAPH SYSTEM INCLUDING
MEANS FOR CHECKING THE ADVERSE INFLUENCE
OF SIGNAL ELEMENT PROLONGATION
Filed July 14, 1959  7 Sheets-Sheet 2

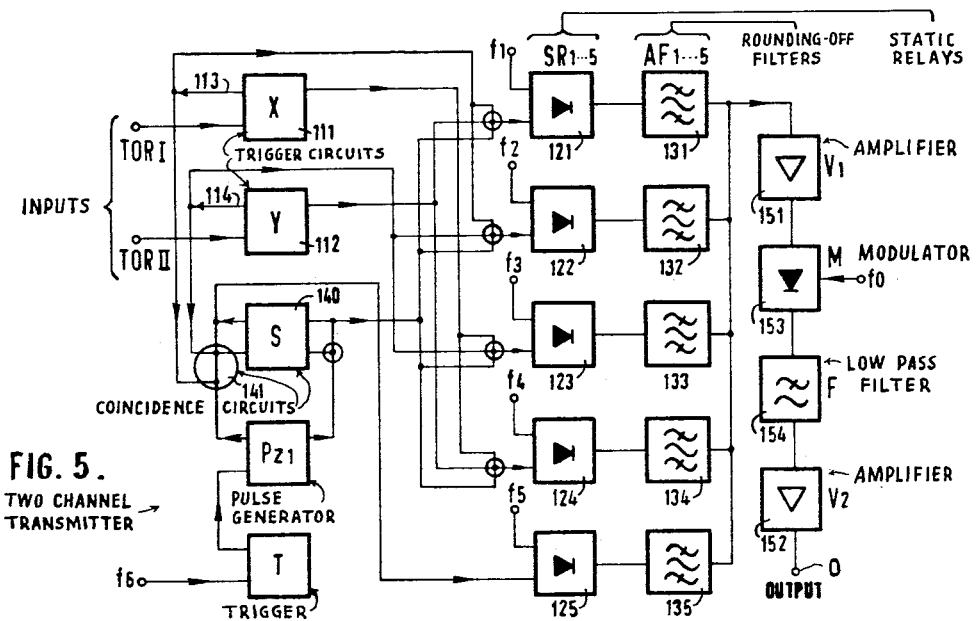

FIG. 5.
TWO CHANNEL TRANSMITTER

| TABLE OF DIFFERENT FREQUENCIES OF SIGNALS TRANSMITTED | $f_0$ | 9500 c/s | |
|---|---|---|---|
| | $f_1$ | 7200 c/s | w I; R II |
| | $f_2$ | 7600 c/s | w I; W II |
| | $f_3$ | 8000 c/s | r I; W II |
| | $f_4$ | 8400 c/s | r I; R II |
| | $f_5$ | 8800 c/s | AUXILIARY TONE |

FIG. 6.

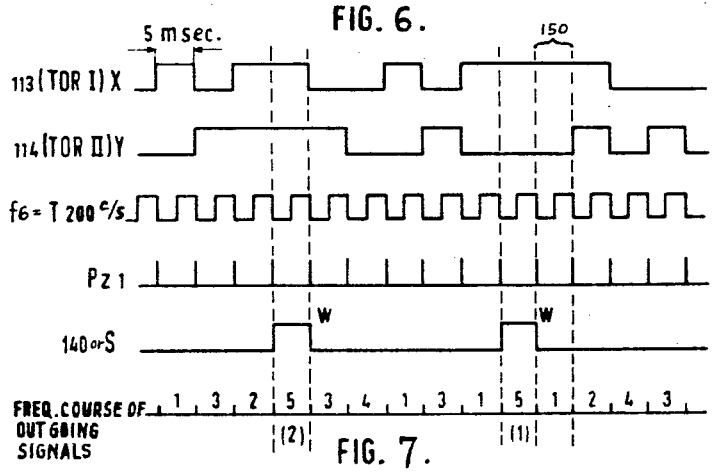

FIG. 7.

INVENTORS:
H. C. A. VAN DUUREN,
JAN TUINMAN.
BY
ATT'Y.

INVENTORS:
H.C.A. Van Duuren,
Jan Tuinman.
BY Hugh A Kirk
ATT'Y.

MODIFICATION OF LAST THIRD OF
RECEIVER CIRCUIT OF FIG. 6.

INVENTORS:
H. C. A. VAN DUUREN,
JAN TUINMAN.
BY
ATT'Y.

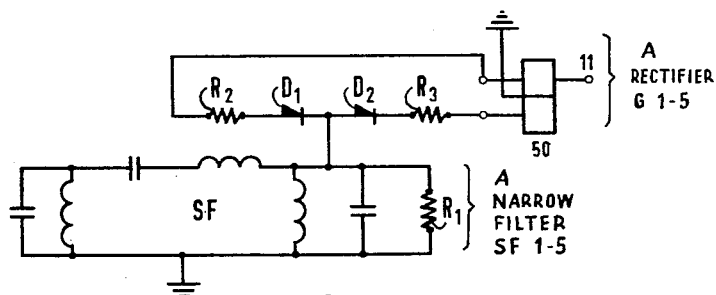
FIG. 13
| I | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| II | | a | b | b | b | c | a | c | a | a | c | c | c | c | c | b | b | b |
| III | | a | b | $u_1$ | $u_2$ | c | a | $u_2$ | $u_1$ | a | c | $u_1$ | $u_2$ | c | $u_1$ | b | $u_2$ | $u_1$ |
FIG. 15.
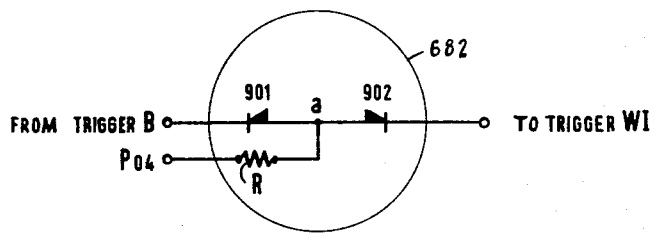
FIG. 14.

United States Patent Office 3,026,372
Patented Mar. 20, 1962

3,026,372
MULTIFREQUENCY TELEGRAPH SYSTEM IN-
CLUDING MEANS FOR CHECKING THE AD-
VERSE INFLUENCE OF SIGNAL ELEMENT PRO-
LONGATION
Hendrik Cornelis Anthony van Duuren, Wassenaar, and
Jan Tuinman, Leidschendam, Netherlands, assignors
to De Staat der Nederlanden, ten Deze Vertegen-
woordigd Door de Directeur-Generaal der Posterijen,
Telegrafie en Telefonie, The Hague, Netherlands
Filed July 14, 1959, Ser. No. 826,971
Claims priority, application Netherlands July 18, 1958
20 Claims. (Cl. 178—88)

The invention relates to a multifrequency telegraph system including means for checking the adverse influence of signal element prolongation.

It is an object of this invention to improve the signal-to-noise ratio in frequency modulated signals of a multi-frequency telegraph system not only with respect to errors for fading but also with respect to errors for "extras," which "extras" are caused by noise or spurious signals at moments they agree with the desired signal frequency to be received.

Another object is to produce such a system in which spurious frequencies are damped away.

Another object is to produce such a system in which the means for detecting the signals produces an integrating effect which is applied where the selecting effect for that particular signal is a maximum.

Still another object is to provide an improvement over the system disclosed in U.S. copending application S. N. 690,706 filed Oct. 17, 1957 now U.S. Patent No. 2,974,196.

Generally speaking, the system of this invention comprises: a transmitter for producing frequency modulated signals of substantially equal lengths wherein no two adjacent signals have the same frequency, a receiver for receiving such successive different signal frequencies, and a means for checking the adverse influence of signal element prolongation in the receiver. This checking means includes means for limiting the signal amplitude after the signal passes an input wide band-pass filter, and a narrow band-pass filter after the limiter. Such a combination is especially advantageous to suppress the above mentioned "extras" and is an important result and advantage over the automatic error correcting TOR (Telegraph Over Radio) type telegraph systems of the constant ratio code type, such as those disclosed in Van Duuren U.S. Patents No. 2,279,353 and No. 2,313,980 and British Patent No. 778,621, which deal primarily with only one type of error, namely those due to fading, more than with the errors which are due to extras, particularly when both fading and extras occur simultaneously.

More specifically, this invention gives a considerable improvement in these respects, because the transmission is effected by means of $2^k+1$ frequencies ($k$ being the number of channels), which are passed in the receiver via a comman band pass filter, followed by band-stop filters connected in parallel, by a selecting switch for the latter filters and by a common limiter, and further via individual filters which have on each frequency an integrating effect due to their narrowness and their consequent considerable transient time.

A limiter thus has the property of damping away spurious frequencies that are weaker than the tone actually supplied to the limiter. An additional, or perhaps allied phenomenon consists in an increase of the signal-to-noise ratio with a suitable choice of the band-widths of the filters before and after the limiter. Within the useful-frequency range the suppression of "extras" is more effective, as the ratio of the band-width is larger in a suitable relation to the threshold used in the limiter. The switching unit is controlled by the triggers provided per narrow filter.

It is to be observed that the integrating effect or working as applied here is preferably located at a point where the selective effect is a maximum, this in contradistinction to the method followed in former integrating scanning systems, in which the integration occurs only after the rectification.

Between the said narrow filters and the ultimate triggers, rectifiers have been provided, having an output threshold determined according to the invention by rectifiers for all the individual frequencies. For this purpose individual rectifiers may be provided in duplicate; thus it is achieved that only signals above noise level can change over these output triggers.

The working of the said arrangement is based on the switching-in of the band-stop filter by the switching unit for a signal frequency, as soon as it is signalized by the relevant trigger. The control of the switching unit by the triggers is adjusted accordingly.

The width of the narrow filters is such that a nominal frequency signal arriving builds up to, for example, ⅔ of the maximum (final) value in the time available for the transient phenomenon. This time will be shorter than the nominal signal element durations, notably by a lapse of time required to damp away a previous signal and for which e.g. 10–15% of the element duration is taken. Within that time a short-circuit, controlled by a pulse, can succed in reducing the amplitude in the filter to ⅛ of the maximum. This measure is intended to ensure that every new start finds a filter being practically at rest, so that the integration of the element gives a correct image of the meaning of the signal.

This invention relates also to a multi-channel system, in which each successive signal transmitted is a different one of a number of pre-determined frequencies, which signal is determined by the polarities of the signals occurring in all of the channels. If there are, for example, two channels and four different frequencies, frequency 1 may mean $wW$; frequency 2 may mean $wR$; frequency 3 may mean $rW$; and frequency 4 may mean $rR$, wherein $w$ and $r$ representing the marking and spacing polarities in channel I and W and R representing the marking and spacing polarities in channel II.

The above mentioned and other features and objects of this invention, and the manner of attaining them, will become more apparent and the invention itself will be understood best by reference to the following description of embodiments of the invention taken in conjunction with the accompanying drawings wherein:

FIGS. 1 through 4 are comparative schematic signal diagrams relating to the disposition of limiters in said prior art co-pending U.S. patent application Serial No. 690,706 filed Oct. 17, 1957, now U.S. Patent 2,974,196;

FIG. 5 is a schematic block wiring diagram of a two-channel transmitter according to one embodiment of the present invention;

FIG. 6 is a table of the audio frequencies used for the signals to be transmitted in the transmitter circuit shown in FIG. 5;

FIG. 7 is a time diagram of the signals and pulses employed in controlling the transmitter system shown in FIG. 5;

FIG. 13 is a wiring diagram of an attenuating circuit as may be employed for one narrow band-pass filter SF1–5 and its associated detector-rectifier circuit G1–5 as shown in FIG. 8;

Figure 8:
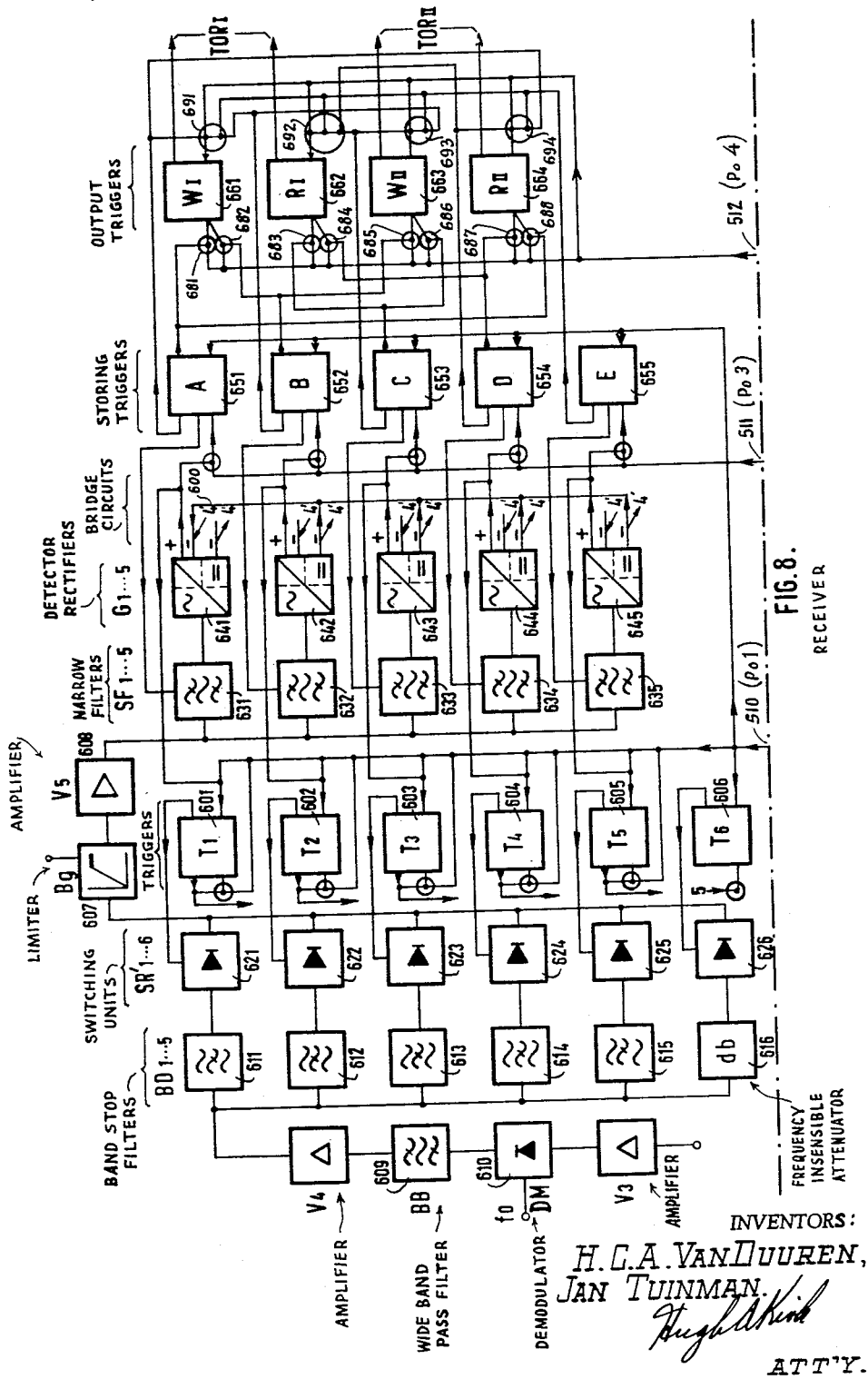
FIG. 8 is a schematic block wiring diagram of one embodiment of a receiver circuit for the signals transmitted from a circuit according to FIG. 5.

FIG. 14 is a detailed wiring diagram of one of the coincidence circuits, specifically one which may be used between a storing trigger and the output trigger circuit and controlled by a pulse as shown in circle 682 of FIG. 8; and FIG. 15 is a table of how the different frequencies corresponding to successive signals are converted into two auxiliary frequencies $u_1$ and $u_2$ for transmission according to a further embodiment of the system of this invention.

Prior Art

A telegraph system in which the prejudicial influence of element prolongation, which especially becomes appreciable at high signaling speeds, is checked by the use of auxiliary frequencies, has been described in the U.S. copending patent application Serial No. 690,706.

In this said copending application it is described how at the receiving end, the frequencies can be sent in pairs through limiters B1 and B2 in a manner illustrated in FIG. 1, frequencies 2 and 3 being led through one limiter, and how in such a circuit arrangement it is found as a disagreeable effect of element prolongation, for example the prolonged frequency $wW$ frequency in the limiter B1 pushes away the $rW$ frequency, if this frequency happens to be next and if it is somewhat weak on arrival.

In the case of proceeding according to the diagram of FIG. 2 with one limiter B′ being used for all of the four frequencies; measures taken according to said copending application to avoid this detrimental effect amount to replacing in the transmitter a frequency which would have to pass through the same limiter as the previous frequency by an additional frequency, which will be called the "auxiliary frequency" in the description which follows. Thus the arrangement of FIG. 3 is obtained from FIG. 1; and the arrangement of FIG. 4 results from that of FIG. 2 in that four auxiliary frequencies would be needed to suppress the effect of the signal element prolongation, so that the limiters B12 and B22 alternate with the successive signal elements.

It is to be observed that it is not necessary in FIG. 3 to have recourse to the "auxiliary frequency" for the frequency $wW$ element following a frequency $wW$ element, because the prolonged first element $wW$ frequency will not hinder the second element $wW$ frequency; except, however, for the possibility of an "auxiliary frequency" of 0 or nothing being transmitted.

At the receiving end, for example in FIG. 3, $w$ (auxiliary frequency) supplied to B33 is interpreted by the apparatus as $wW$ if the previous element has been $rW$. The question is whether in a given two-channel system with protection against signal element prolongation according to this said earlier copending patent application, the arrangement of FIG. 3 or that of FIG. 4 will be preferred, is not only determined by the frequency band available (with equal frequency intervals, the FIG. 4 case requires a somewhat wider frequency band than the FIG. 3 case), but also the problem of suppressing extras, static, noise or spurious signals at the time of the desired signal.

The grouping of the limiters must be considered in connection with the grouping of the input band-pass filters, and aerial noise, static, or extras will have less access to the following apparatus, since the noise is suppressed in the input filters and limiter. Now a limiter is found to have a property due to which the attenuation of the tone in the limiter is larger, according as that tone is accompanied by other tones and this effect is stronger when the accompanying tone or tones are stronger in comparison with the first-mentioned tone.

The Transmitter

In the following description a TOR apparatus as mentioned in the above Van Duuren patent will be employed. For a good understanding it is pointed out that this apparatus is not essential for the performance of the invention and might be replaced by another synchronous system, working with element durations of the order of the element prolongations.

Generally, according to the above, more auxiliary frequencies will be used, depending upon whether the element duration is smaller or larger with respect to the element prolongation. Such an application of the leading thought of the invention is particularly possible in a wide band or scatter transmission method.

In the unipolar schematic block wiring diagram of FIG. 5, the trigger circuits 111 and 112 (or X and Y, respectively) are instigated or triggered by the incoming signals over the TOR channels I and II, which triggers X and Y produce at their output terminals marking or spacing polarities.

Four variations of these states are possible. These variations must be represented by four tones, see FIG. 6. The four tones are applied to the output terminal O of the circuit of FIG. 5 under the control of static relays SR1–4 or 121–124 followed by rounding-off filters AF1–4 or 131–134.

Some examples of signals which may be applied via TOR-channel input terminals I and II are represented as pulse waves by the upper two lines in FIG. 7.

Every time the state of the two channels is the same as during the preceding element of time, the "auxiliary tone" is transmitted in the relevant element, under the control of the static relay 125 via the rounding-off filter 135, instead of the tone transmitted in the said preceding element.

For this purpose every following element is compared in the coincidence circuits 140, 141 with the preceding one, which is stored for a short time by means of delayed output terminals 113 and 114 of the triggers 111 and 112. The coincidence circuit 140 or S is blocked in the correct intervals as timed by a frequency wave $f_6$ (200 c./s. in FIG. 7) originating from a basic frequency divider, and as determined by the said delayed output terminals 113, 114 (the terminal to which frequency wave $f_6$ is supplied is shown in the lower left of FIG. 5). The frequency divider that generates the basic frequency of 200 c./s. is not shown. Trigger T controls a pulse generator Pz1, which controls circuit 140 or S. The latter finds out whether the states of trigger circuits X or Y remain unchanged during the successive elements. The basic frequency of 50 bauds (50 pulses per second) is also the frequency of the signals delivered by the two TOR apparati or equipments. During the said blocking the access to the static relays SR1–5 or 121–124 is interrupted by coincidence circuits 140, 141. The access to static relay 125 is made possible during the auxiliary tone interval, so that frequency $f_5$ can be delivered during working periods of circuit 140 or S, see FIG. 7. The bottom line of this figure indicates the numbers of which frequencies are delivered; (2) and (1) under the line indicate that at the relevant moments frequencies 2 and 1, respectively would have to be repeated or continued.

Due to the operation of circuit S, however, these frequencies are replaced by the auxiliary tone frequency $f_5$. During element 150 the auxiliary tone 5 must be replaced again by tone 1, which it replaced during the previous element.

After having passed through the rounding-off filters AF1–5 or 131–135, the signal frequencies attains via amplifiers V1 and V2 or 151 and 152, modulator M or 153 and low-pass filter F or 154 inserted between these two amplifiers, the output O to the transmission path. In modulator 153 frequencies $f_1$ to $f_5$ (FIG. 6) are transposed by modulation with a frequency of 9500 c./s. down to a series running from 2300 to 700 c./s., which series is better suited for transmission via cables to the radio transmitting station.

The rounding-off filters AF1–5 or 131–135 are to suppress the harmonics resulting from static relay switchings SR1–5 (121–125) and to guarantee a fluent transition from one tone to the next.

The Receiver

Figure 9:
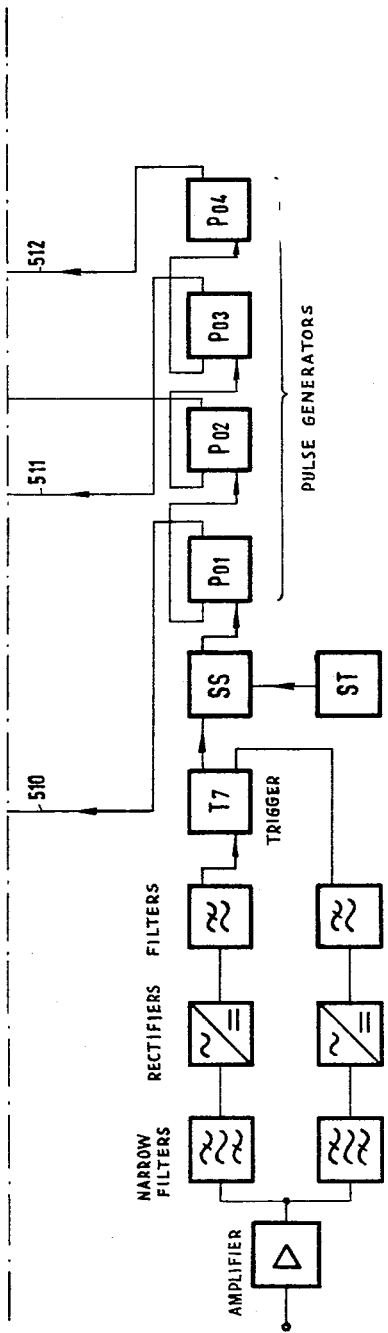
FIG. 9 is a schematic block wiring diagram of a pulse generating circuit for the receiver circuit shown in FIG. 8, which fits along the bottom dot-dash line shown in FIG. 8 to complete the circuit of the receiver of FIG. 8.

The series of tones transmitted to the receiver of FIG. 8 arrive at the receiver input is shown at the lower left of FIGS. 8 and 9. They are transposed to lower frequencies in a demodulator DM or 610 and pass then through a wide band-pass filter BB or 609, the output terminal of which is multipled to band-stop filters BD1–5 or 611–615 and to the frequency-insensible attenuator db or 616. The central frequencies of all the filters are designated by $f_c$, their band-width by $b$.

Filters BD1–5 or 611–615 have an attenuation peak for their central frequencies. Filters 611–615 and attenuator 616 are followed by switching units SR1–6 or 621 to 626, which connect, every time a signal element is received, one of the filters to the next circuit consisting of a limiter Bg or 607 and an amplifier V5 or 608, followed by narrow band pass filters SF1–5 or 631–635 having an integrating working effect on the signal. The central frequencies of these filters are designated by $f_{cs}$, their width by $b$. Thus, if the width is small, the transient time amounts to 1.5—2 times the element length. The filters 631–635 feed detector or amplifier rectifiers G1–5 or 641–645, which in their turn feed a bridge circuit, in which the output signal of each detector is confronted with a noise level generated from the combined output terminals of the other four detectors or rectifiers. These things are shown in FIG. 8 by means of the—signs at the output terminals of the detectors or amplifier—rectifiers 641–645 and the arrows marked 4' also placed near these terminals. For the relevant influence of the lower four rectifiers on the upper ones, one bridge circuit connection 600 is shown; for the other combinations these connections must be considered to be provided, in such a sense that an incoming arrow symbolizes an incoming comparison level and an outgoing level contributes to the formation of the comparison level. The relevant connections constitute a matrix with each outgoing arrow multipled with three other output arrows and connected to an input arrow.

The receiver shown in FIG. 8 is controlled by pulses generated in the circuit of FIG. 9, which is connected to it in such a way that the pulses from generator (Po1) arrive via conductor 510 to control the working of the triggers T1 to T6 in that time, and similar pulses from generator Po3 arrive via conductor 511 to control the working of triggers A–E or 651–655.

The pulses are derived from the edges of a pulse system generated locally, so that the intervals are rather accurately equal; a synchronizing device every time ensuring a fixed relation between the place of any of these pulses and the average edge of the signal elements received.

Figure 10:
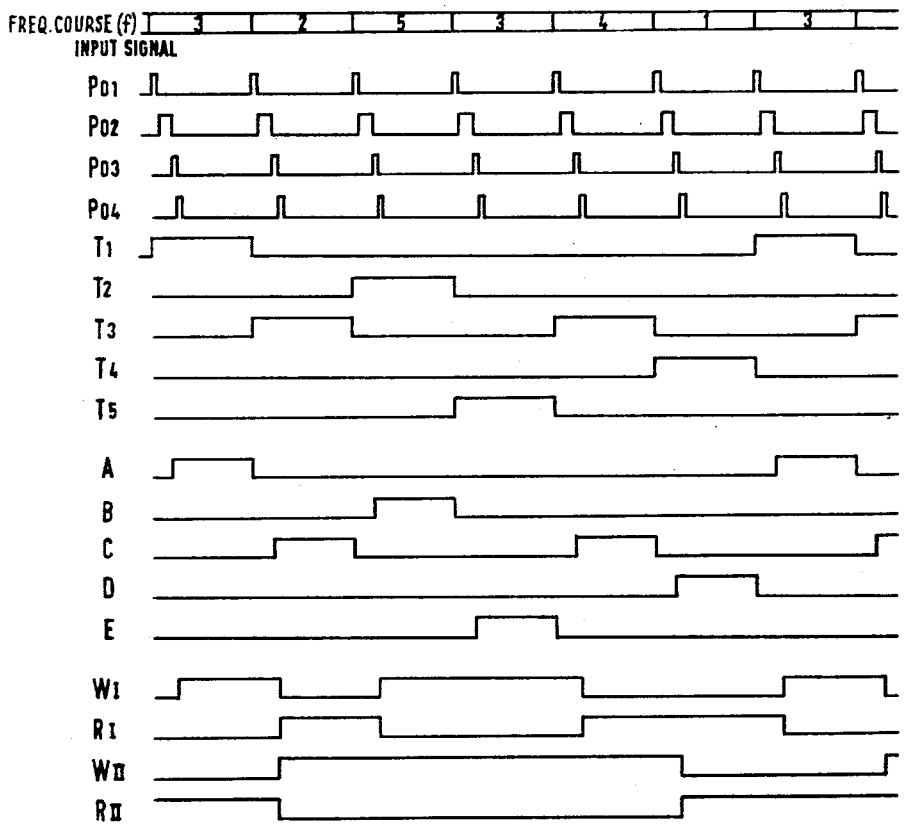
FIG. 10 is a time diagram of the pulses generated in the circuit according to FIG. 9 and used in the circuit according to FIG. 8.

The relevant moments are indicated with some shift in FIG. 10. This shift results from the fact that in this example the group transit time of the narrow filters 631–635 is allowed for. Each of these filters is designed as one whole section of a constant $k$-filter. In this case the bandwidth must be taken so small in order to obtain a sufficient selectivity that the maximum of the voltage at the detector is only attained some time e.g. 10–20% of the pulse duration after the end of the relevant pulse (at the input terminal of the narrow filter). If these filters are carried out as half sections of a peaked filter, the selectivity remains sufficient and the transit time becomes so much more favorable that the switching in time of the triggers practically coincides with the moment of the scanning by storing triggers A–E or 651–655, as determined by pulses Po3 (see FIG. 10). No pulses Po2 are delivered; in the example (see FIGURES 9 and 10) they only indicate the distance between pulses Po1 and pulses Po3. Pulses Po4, derived again from pulses Po3 are to set the output triggers WI, RI, WII, RII or 661–664 in the circuit of FIG. 8 as well as in the variant or modification of this part of the circuit of FIG. 8 on the understanding that in the latter circuit only two output triggers WI' and WII' or 671 and 672 and an error indicating trigger F1 or 673 are provided. The error indicating trigger 673 reacts if it appears at the end of a signal element that none of the triggers A through E has been changed over. By marking such an element as wrong, instead of letting it indicate a polarity determined by accidental circumstances, the risk of wrongly printed signals can be considerably reduced, especially in automatic RQ or automatic error correction systems as described in the prior U.S. Van Duuren patents mentioned above.

The working of pulse Po1 is as follows: During the application of this pulse Po1, one of the triggers T1 to T5 may be changed over, if there is a signal in the corresponding narrow band-pass filter SF1–5. The circuit arrangement of the triggers is such that at any moment only one of the six triggers T1–T6 can be open. Assuming this is trigger T2, static relay SR'2 or 622 will also be open via the connection shown in FIG. 8 and the frequency $f_1$, for example, can come in on band-stop filter BD2 or 612 and cause, via limiter Bg or 607, amplifier V5 or 608, and the narrow band-pass filters SF1 or 631, the amplifier-rectifier G1 or 641 to operate at the moment determined by pulse Po3. This puts trigger T1 or 601 in the "open" state, so that the other triggers T2–T6 assume the "closed" state. Tone 1 corresponding to frequency $f_1$ is hereby interrupted, as band-pass filter BD1 or 611 does not transmit the tone and the static relays SR'2–6 or 622–626 are all closed. As in other detection systems a thresholding voltage may be used, as a result of which the number of "extras" is drastically reduced. (By "extras" are meant reactions of one of the detectors caused by noise or spurious signals at moments they agree with the desired signal frequency.) According as the threshold voltage is higher, it will more often occur when the signal is not strong enough to be detected; the preferred value of the threshold voltage is the value at which the advantages (suppression of the "extras") counterbalance the disadvantages (suppression of desired signals). Considered in connection with the transit time of the filters and the speed of integration, the value of the threshold voltage will influence the time required for the detected voltage to attain a value large enough to ensure a reaction to the signal element.

This effect can be utilized in cases where a strong signal element is followed by a very weak element by making the integration time for the latter element as large as possible.

Only in case there arrives none of the signal frequencies $f_1$–$f_5$, none of the static relays SR'–1–5 or 621–625 is open at the end of the relevant pulse, in which case the static relay SR'6 or 626 is open so that an incoming path is formed for the new signal via the attenuator db or 616, the limiter Bg or 607, etc. This is particularly of interest if the frequency coming back after the signal interruption is the same as the one received before the interruption.

This previous frequency may have entailed a registration in one of the triggers T1 to T5 and the consequent opening of the relevant static relays SR'1–5, so that the relevant band-stop filter BD1–5 or 611–615 has been set, whereas all the other triggers of the group T1 to T5 have assumed the inactive state due to the response of the said trigger, so that all the associated static relays are blocked. Under these circumstances the frequency coming back finds no path to the limiter 607 and it is the attenuator $dB$ or 616 that has been provided for such a contingency.

The band-width of filters SF1–5 or 631 to 635 amounts to approximately 140 c./s.; that is to say their transient time is a little larger than the duration of a signal element; consequently, they have an integrating effect during the transient phenomenon caused by a signal. In operation with the limiter $Bg$ or 607 and the wide input band-pass filter BB or 609 they influence the signal-to-noise ratio. If during an element the signal in one of the narrow filters SF1–5 or 631–635 has sufficiently built up to overcome the threshold level in one of the amplifier-rectifiers G1–5 or 641–645, the relevant trigger of the group A–E or 651–655 is changed over; triggers 651 to 655 are set by pulse $Po3$ via conductor 511 according to the signal and will be made inactive during pulse $Po1$ (see FIG. 10).

Figure 12:
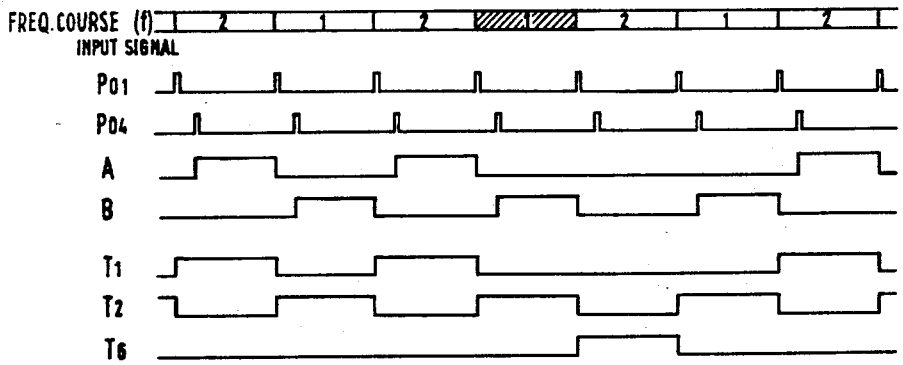
FIG. 12 is a time diagram similar to that of FIG. 10 illustrating a frequency-independent signal channel to prevent blocking in case of trouble and corresponding to the operation of the circuit in the modified embodiment shown in FIG. 11.

The working of attenuator $dB$ or switching unit 616, just described, is illustrated in FIG. 12. The bottom line of this figure shows a signal element in which occurs the relevant working, notably after the signal preceded and followed by frequency 2 has fallen out, as indicated by the shaded or hatched portion in the top line.

Figure 11:
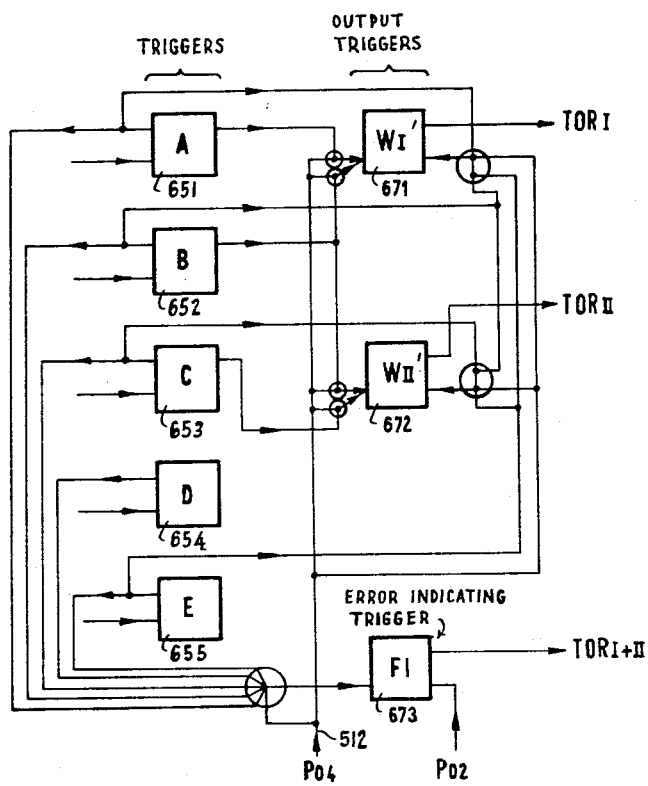
FIG. 11 is a schematic block wiring diagram of a modification of the output part or right-hand third of the circuit diagram of FIG. 8.

In the connections between the 651–5 and the 661–4 groups of triggers, it is deduced from the combination of states of triggers 651–655 existing at the end of a signal element which of the four triggers 661–664 will eventually be changed over. The relevant triggers apply the desired signals to the TOR receiving apparati or equipments I and II. Impossible combinations are detected by these equipments, particularly the state in which none of the triggers 651–664 has been changed over. In the modification of FIG. 11, this state is signalled particularly by trigger F1 or 673, from the operation of which it can be concluded that there exists a state of disturbance which must cause the receiver to be blocked. The figure does not illustrate this blocking, however.

The circuits causing the described operation of triggers 651 to 655 can easily be traced in the figure. The lower terminals of the rectangles are always input terminals, at the right as well as at the left side thereof. The lead-in wires of the triggers contain electronic relays or rectifier circuits represented by encircled coupling points and which detect whether the conditions as regards the amplifier-rectifier and pulse $Po3$ are fulfilled simultaneously.

Of each trigger A–E or 651–655 the first output terminal at the left is connected to the relevant narrow band-pass filter SF–1–5, respectively; this connection is intended to ensure that the signal is damped away in the filter as soon as it is found at the output terminal. After that the filter is again quite uncharged, ready to react to a next signal. If this were not the case the energy persisting in the filter might form a considerable opposed voltage during the next scanning, so that the working of the next signal element would be much hampered.

The fifth trigger E or 655 reacts to the "auxiliary tone" frequency $f_5$ which, if present to show the succession of identical signal frequencies at the transmitting end, prevents via the upper output terminal at the left, output triggers WI, RI, WII, and RII or 661 to 664 from restoring to normal, which would otherwise occur during pulse $Po4$ connected to these output triggers via conductor 512. The damping of a band-pass filter SF1–5 or 631–635 under the influence of a trigger A–E or 651–655, may be effected as shown in FIG. 13. In one state of the trigger its output voltage will render electronic relays or rectifiers $D_1$ and $D_2$ blocking, as a result of which resistors $R_2$ and $R_3$ have no damping effect on the filter. In the other state, rectifiers $D_1$ and $D_2$ become conducting so that the filter is damped by resistors $R_2$ and $R_3$, both of which are connected in parallel to the last circuit of the filter in that case.

In this case resistors $R_2$ and $R_3$ must not be taken arbitrarily small, because then the capacitor of the said circuit would be discharged along a very steep curve, but the inductor would need a longer time to dissipate the energy stored in it.

In principle, the switching of filters BD1–6 or 611–616, the damping of filters SF1–5 or 631–635 and the passing-on of the information could be effected at the same moment. The transit time and the transient time of filters SF1–5 or 631–635 may be so large, however, that the maximum value of the detector voltage is only attained some time after the pulse at the input terminal has finished, and in that case that maximum value may be much higher, for example 3 decibels, higher than at the end of the pulse at the input terminal. So for weak pulses it is of importance that the scanning of the information occur only at this delayed moment. In view of the signal prolongation, however, it is of importance that the switching of the band-stop filters BD1–5 or 611–616 is effected as early as possible, especially if the tone pulse that just arrived was strong. (If this element was weak, the risk that the next element will be weaker still is much smaller, and, consequently, the effect of element prolongation will be much smaller, because the risk of a weak signal element in the limiter being pushed away by the prolonged part of a preceding, stronger, element is much smaller.)

Especially in the case of a strong signal element, there is a good chance that during the pulse $Po1$, the positive detector voltage will be large enough to change over the desired trigger T1–T5. Thus the switching SR'1–6 of band-stop filters BD1–5 on the one hand and the discharge of the narrow filters SF1–5 and the storage of the information in storing triggers A–E or 651–5 on the other hand can be effected with advantage by means of different pulses, $Po1$ and $Po3$, respectively.

If, however, the duration of a signal element is so large with respect to the transit time and the transient time of the narrow filters SF1–5 that after the end of the tone pulse the detector voltage no longer increases in a measure worth mentioning, one and the same scanning pulse can be used with advantage for switching the band-stop filters BD1–5 or 611–616 and for damping the narrow band-pass SF1–5 or also possibly passing on the information from the storing triggers A–E or 651–5.

Operation of the Receiver

For a further explanation of the working of the receiver the following is observed with reference to FIG. 8.

Suppose one of the keyed frequencies is received. As is known the input terminals of the receiver are connected to a telegraph circuit of which the characteristic impedance is e.g. 600 Ω. This circuit has a frequency range of approximately 500–3000 c./s. If a frequency of 2100 c./s. appears at the input terminals, it passes amplifier V3 and is applied to demodulator DM(610). The frequency $f_0$ of 9700 c./s. is also applied to this demodulator . The resulting beat-frequency $f_2$ (9700–2100 c./s.) passes a wide band-pass filter BB (609), the transmission band of which lies between 6700 and 9400 c./s. Beyond this filter the signal is applied via the amplifier V4 to five band-stop filters BD1–5 (611–615) and an attenuator $dB$ (616), each of which is connected to one of the static relays SR'1 through 6 (621–6). The static relays are controlled in their turn by triggers T1 through T6.

At any given time, only one of these relays SR'1–6 is in the open state. It results from this that of triggers T1 to T6 (601–6) only one is in the operating state. The signal (frequency $f_2$) appearing at the input terminals of filters BD1–5 and attenuator $dB$, only undergoes in filter BD2 a large attenuation according to previously selected example mentioned above.

It can pass via the other filters, 611, 613, 614 and 615, and the attenuator dB, if one of the static relays SR'1, 3–6 is open. Suppose static relay SR'3 (623) is open, then frequency $f_2$ attains via it the input terminal of limiter B$g$ (607). After the signal has been limited, it is amplified in V5 (608). The output terminal of this amplifier is connected to the five narrow filters SF1–5 (631–5) which have as their task the selection of the different frequencies. The signal (frequency $f_2$) passes the narrow filter SF2 (632), is amplified and applied to two rectifiers G2. It is the positive voltage which provides the condition for the operation of triggers 601 through 605 and triggers 651 through 655. This positive voltage of each of the detectors G1–5 is counteracted, however, by a combination of the negative voltages of the four other detectors, in order to reduce the risk of an undesired operation caused by noise.

In the case described (the incoming tone being frequency $f_2$) trigger T2 (602) will be activated by pulse P$o$1, under the condition of the positive voltage coming from rectifier 642. At the same moment pulse P$o$1 restores trigger T3 (603) to normal because SR'3 was previously considered to be operated. The result passes through limiter B$g$ or 607. A moment later pulse P$o$3 causes trigger B (652) to operate, also under the condition of the positive voltage from rectifier 642. The result will be that (a) the energy stored in filter 632 is quickly damped and (b) the information stored in trigger B is transmitted a moment later. At the same moment pulse P$o$1 puts trigger T3 (603) in the normal condition. The result will be that static relay SR'3 (623) is shut and SR'2 (622) is opened, so that frequency $f_2$ is not passed by band stop filter BD2 (612). This means that a possible element prolongation has no influence on the circuit, not even in the common limiter B$g$ or 607. As has already been described, storing trigger B (652) is in the operative condition (due to the reception of frequency $f_2$). Now trigger B (652) damps the corresponding narrow filter, so that the energy is taken away from the filter. Triggers A to E are connected via a number of diode circuits to the input terminals of the output triggers WI, WII, RI and RII. If trigger B (652) is in the operative state when pulse P$o$4 (512) appears, triggers WI and WII are activated by means of the diode circuits.

It can be seen that the reception of frequency $f_2$ causes that both receiving stations TORI and TORII are supplied with a so-called marking element. In the same way the other frequencies are converted into marking and spacing elements.

Finally the working of the diode circuits used will be described. In the figures these diode circuits are represented by circles. They consist actually of a number of diodes and a resistor R (see FIG. 14). It will be clear without further explanation that the number of diodes depends on the number of conditions the circuit is to satisfy. In order to avoid an unnecessary complication of the explanation, the number of diodes in the example in FIG. 14 is restricted to two, namely 901 and 902. One diode, 901, is connected to the output terminal of trigger B and the other, 902, to the input terminal of trigger WI, resistor R being connected to pulse generator P$o$4. It is a first requirement that the resistance value of R is large with respect to the forward resistance of the diodes used. Further the reverse resistance of the diodes must be large with respect to the resistance value of R. This resistor R is supplied with a negative potential, when there is no pulse P$o$4. The output voltage of trigger B determines whether the positive pulse P$o$4 can or cannot reach the input terminal of trigger WI and cause it to change over.

If the output voltage is positive (trigger B being in the operative state), when the positive pulse P$o$4 appears, the connecting point $a$ assumes a positive potential also. The positive pulse P$o$4 reaches via diode 902 (in the forward direction) the input terminal of trigger WI. It is clear that diode 901 presents its reverse resistance to the output voltage of trigger B, so that this voltage cannot influence pulse P$o$4. If the input terminal of trigger WI has at first a negative potential, the positive pulse P$o$4 will change the state of the trigger. In the other case, the output voltage of trigger B being negative (trigger B being in the normal condition), this negative voltage finds diode 901 in the forward direction. Connecting point $a$ remains negative, when the positive pulse P$o$4 appears via resistor R. Now diode 902 is in the blocking state so that there appears no pulse at the input terminal of trigger WI. So the trigger remains in its original state. This above described principle of the diode circuit applies also to all the coincidence circuits and electronic switching relays shown in the various figures.

The transfer of the information from any storing trigger A–D (651–654) to the marking and spacing triggers (661–664) of the two TOR channels occurs as follows:

If storing trigger A (651) has operated (under the control of tone $f_1$), pulse P$o$4 will activate trigger WI via coincidence circuit 681 and trigger RII via coincidence circuit 688. At the same time trigger RI and WII are restored to normal if they were in the operative state) via coincidence circuits 692 and 693; the left-hand output terminal of trigger A prevents (via coincidence circuits 691 and 694 output triggers WI and RII from being restored to normal or kept at normal by pulse P$o$4. In like manner storing trigger B causes via coincidence circuits 682 and 685 the operation of WI and WII, respectively, trigger C causes via 683 and 686 the operation of RI and WII, respectively, and trigger D causes via 684 and 687, the operation of RI and RII, respectively. In any of these cases other triggers of the group 661–664 being in the operative state, if any, are restored to normal via one of the coincidence circuits 691–694.

If trigger E (655) is activated by the "auxiliary tone" ($f_5$), all the coincidence circuits 691–694 are made inactive, so that none of triggers 661–664 is restored to normal. On the other hand, none of these triggers is activated, the states of the two TOR-channels will be the same as during the preceding element (which is the very meaning of $f_5$).

The circuit according to FIG. 11 requires a little less material. What is of more importance is that the number of connections to the two TOR equipments I and II together can be reduced from four to three. Because there are no separate spacing triggers for each TOR apparatus, there is no need of a positive action to make triggers 671 and 672 indicate the spacing condition. Thus the trigger D may be omitted entirely, but it is maintained only for its contribution to the operation of trigger F1 (673) (fault indicator). In this case the latter must indicate what resulted without special circuit in FIG. 8, viz. that an element was received neither as a spacing element nor as a marking element. If all the five storing triggers A–E are at normal, pulse P$o$4 will cause trigger F1 to operate. If only one trigger has operated, the operation of F1 is prevented. Each time F1 has operated, it is restored to normal by pulse P$o$2.

Generally, working with $2^k+1$ frequencies ($k$ being the number of channels) will be sufficient to eliminate the detrimental effect of element prolongation. If moreover displacements (in general retardations) of starts are encountered (both effects together being characterized as element displacement), it may be useful to work with $2^k+2$ frequencies (see FIG. 15). The number of auxiliary frequencies may be larger still, especially if the signal elements are very short and considerable displacements must be handled. However usually working with one auxiliary frequency will be sufficient to eliminate the detrimental effect of element prolongations, notably if the maximum element prolongation (including the displacement) in general the retardation, is smaller than the element duration.

If the total element prolongation is larger still (in proportion to the signal element duration), so that it may happen that a prolonged signal element continues down to the second element to follow, the receiver has to be rendered insensible to this tone for more than a signal element duration after the reception of every tone pulse. In that case two or more auxiliary tones ($u_1$ and $u_2$ see FIG. 15) must be used; the first of which $u_1$ has the same meaning as before, viz. same tone as the last preceding one, while the second auxiliary tone means: the same tone as the last preceding tone but one.

Line III in FIG. 15 shows by way of example how the succession of tones indicated on line II can be transmitted according to the "two auxiliary tones" principle. The normal tones are designated by $a$, $b$ and $c$, the two auxiliary tones by $u_1$ and $u_2$. Line I shows simply the order of succession of the elements. With these few remarks FIG. 15 will be self-explanatory, except of elements 8 and 16. In element 8 one would have expected tone $u_2$, but because this tone occurs in the 7th element it cannot be used here. Yet $u_1$ will also entail a correct interpretation in the receiver, notably as follows: $u_1$ refers to the last preceding element; this was $u_2$, which means: see the last preceding element but one, which counting from the 8th element is the 6th one, and this was indeed the desired tone $a$. A reasoning analogous to the one held for the 8th element applies to the 16th element.

When the band-stop filters are switched in, it must be seen to that every time two (or more) tones must be stopped at a time, two or more filters must be put in tandem.

While we have illustrated and described what we regard to be the preferred embodiment of our invention, nevertheless it will be understood that such is merely exemplary and that numerous modifications and rearrangements may be made therein without departing from the essence of the invention, we claim:

1. In a multi-frequency telecommunication system for telegraph signals consisting of elements of equal time lengths in which adjacent elements are always of different frequency, including a transmitter for transmitting such signal elements and a receiver for receiving such signal elements, the improvement comprising means for reducing the adverse influence of signal element prolongation comprising in said receiver: separate narrow band pass filters for each of said multi-frequencies transmitted, and separate band stop filter means connected to and controlled by each of said band pass filters for attenuating the frequency received in its corresponding filter a pre-determined time after the reception and passage of each successive signal element thereby and before the end of the normal time duration of each signal element.

2. A system according to claim 1 wherein said pre-determined time after the reception and passage of each signal corresponds to approximately between about the first 10 and 20% of the signal duration time.

3. A system according to claim 1 wherein the duration of said attenuation corresponds to the time length of a signal element.

4. A system according to claim 1 wherein the duration of said attenuation corresponds to the time length of a possible signal element prolongation.

5. A system according to claim 1 including pulse circuit means controlled by the received signal to control the operation of said attenuating means.

6. In a multi-frequency telecommunication system for telegraph signals consisting of elements of equal time lengths in which adjacent elements are always of different frequency, including a transmitter for transmitting such signal elements and a receiver for receiving such signal elements, the improvement comprising means for reducing the adverse influence of signal element prolongation comprising in said receiver: band stop filter means for each of said multi-frequencies transmitted, separate gating means connected to each of said band stop filter means for controlling the output of said band stop filter means, a common limiter connected to all of said band stop filter means through said gating means, separate narrow band pass filters connected to said common limiter corresponding to each of the different frequencies transmitted, and separate detecting means connected to and controlled by each of said band pass filter means for damping the frequency received in its corresponding filter a predetermined time after the reception and passage of each signal element thereby and before the end of the normal time duration of each signal element.

7. A system according to claim 6 wherein said detecting means includes a plurality of triggers controlled by said band pass filters to open only that band pass filter corresponding to the attenuated frequency received.

8. A system according to claim 7 including pulse circuits controlled by the signal elements received by said receiver to control the operation of said detecting means and said triggers.

9. A system according to claim 6 including separate storing trigger circuits corresponding to each of said detecting means and connected to and controlled by said detecting means.

10. A system according to claim 9 including a plurality of output triggers and coincidence circuits connected between said output triggers and said storing triggers for controlling said output triggers by said storing triggers.

11. A system according to claim 6 including attenuator means connected to the input of said receiver, a gating circuit for controlling said attenuator means, and a pulse generating circuit controlled by the receiving signal to control the operation of said gating circuit a pre-determined time after the reception of each of said signals and before the expiration of each of said signals.

12. A system according to claim 11 wherein said transmitter includes means for producing an auxiliary frequency and wherein said attenuator means comprises means responsive to said auxiliary frequency.

13. A system according to claim 6 comprising $k$ channels and $2^k$ frequencies for transmitting information and plus one additional auxiliary frequency.

14. A system according to claim 6 wherein said transmitter includes means for transmitting no frequency at all during one of the time intervals corresponding to a signal element, and means in said receiver for detecting the absence of such a frequency during such a signal element time interval for controlling said receiver.

15. In a multifrequency telecommunication system for telegraph signals consisting of elements of equal time lengths in which adjacent elements are always of different frequency, including a transmitter for transmitting said signal elements and a receiver for receiving such signal elements, the improvement comprising means for reducing the adverse influence of signal element prolongation comprising in said receiver: separate narrow band pass filters for each of said multifrequencies transmitted, and separate means connected to and controlled by each of said filters for attenuating the frequency received in its corresponding filter a predetermined time after reception and passage of each signal element thereby and before the end of the normal time duration of each signal element.

16. A system according to claim 15 wherein said pre-determined time after the reception and passage of each signal corresponds to approximately between about the first ten and twenty percent of the signal duration time.

17. A system according to claim 15 wherein the duration of said attenuation corresponds to the time length of a signal element.

18. A system according to claim 15 wherein the duration of said attenuation corresponds to the time length of a possible signal element prolongation.

19. A system according to claim 15 including pulse circuit means controlled by the received signal to control the operation of said attenuating means.

20. In a multifrequency telecommunication system for telegraph signals consisting of elements of equal time length in which adjacent elements are always of different frequency, including a transmitter for transmitting such signal elements and a receiver for receiving such signal elements, the improvement comprising means for reducing the adverse influence of signal element prolongation comprising in said receiver: separate narrow band pass filters for each of said multifrequencies transmitted, separate means connected to and controlled by each of said filters for attenuating the frequency received in its corresponding filter, means for generating a timing pulse in response to each received signal element, means for delaying said pulse a predetermined time after the reception and passage of each signal element by said filters and before the end of the normal time duration of each signal element, and means for controlling said separate attenuating means by said delayed pulse for maintaining said separate attenuating means actuated during the remaining time duration of that signal element.

References Cited in the file of this patent

UNITED STATES PATENTS

| | | |
|---|---|---|
| 3,347,332 | Phelps | Apr. 25, 1944 |
| 2,358,448 | Earp | Sept. 19, 1954 |
| 2,897,269 | Alphenaar | July 28, 1959 |